Patented Nov. 6, 1945

2,388,235

UNITED STATES PATENT OFFICE 2,388,235

NITROGEN-CONTAINING RESINS AND PROCESS OF EXCHANGING ANIONS IN FLUID MEDIA

Philip I. Bowman, Syracuse, N. Y., and Harry Burrell, Paramus, N. J., assignors, by mesne assignments, to Heyden Chemical Corporation, New York, N. Y., a corporation of Delaware No Drawing. Application July 3, 1941, Serial No. 400,912

6 Claims. (Cl. 210—24)

This invention relates to insoluble resins prepared from compounds containing amino groups, suitable for effecting anion-exchange reactions. In one of its more specific aspects the invention relates to an anion-exchange resin prepared by co-resinification of formaldehyde, melamine and diethylene triamine and to processes of preparing such a resin and exchanging anions in fluid media therewith.

It is an object of this invention to provide white or light-colored materials which are substantially insoluble in liquids, especially aqueous liquids and acid-containing liquids, such materials being suitable for the formation of anion-exchanging filter beds.

It is a further object to provide a process for the preparation of materials which are capable of undergoing an anion-exchange reaction, that is, substances which will replace or exchange an anion bound in the resin (chemically or otherwise) with an anion contained in a liquid being treated.

It is still another object to provide a process for the treatment of liquids with the products of this invention so that objectionable, deleterious or undesirable anions contained in the liquid will be extracted or exchanged for less obnoxious anions.

It has already been found that certain aromatic amines may be converted into products which possess anion-exchange properties. These are described in U. S. Patent 2,151,883. Other materials such as aniline black or protein bodies have also been stated to possess such ability. Attempts to use aliphatic or non-benzenoid substances (that is to say, substances not containing a benzene nucleus) with formaldehyde as the sole resinifying agent have heretobefore been thought to be not applicable for such use. It has now been found, however, that non-aromatic substances containing more than one amino nitrogen group may be resinified with formaldehyde, or other methylene-producing equivalents, so as to form light-colored or pure white substances which are substantially completely insoluble in aqueous and other liquids, including those having an acid reaction. Aliphatic polyamine compounds suitable for making such resins include diethylene triamine, tetraethylene pentamine, hydroxyethyl ethylene diamine, propylene diamine, melamine, and similar substances and their equivalents.

Triazines such as melamine may be resinified with formaldehyde without further additions except catalysts and sometimes water. If straight-chain polyamines are used it is difficult to obtain the resins in sufficiently insoluble form without the addition of some supporting or co-resinifying substance. A particularly desirable compound of this class is urea, since it is easily resinified to an insoluble form and so modifies the straight-chain polyamine-formaldehyde condensation products as to provide a composite product which remains insoluble. It is believed that the urea-formaldehyde resin does not have the power of anion-exchanging per se, and no evidence of any anion-exchange capacity has ever been noted with a simple urea-formaldehyde resin. The purpose of the urea-formaldehyde condensation product in this invention may be considered as more or less mechanical in that it merely modifies the composite resin so that the desirable physical properties are obtained. In certain instances, other types of resins, such as phenol-formaldehyde, aniline-formaldehyde, resorcinol-furfural, and the like, may be employed for similar purposes, but urea-formaldehyde is preferred because the resulting co-resinified materials will not discolor liquids treated therewith. Melamine-formaldehyde resins, as mentioned above, may be prepared, which have both the desired physical properties and the anion-exchange quality. In some cases it is desirable to co-resinify the urea and melamine, however.

In co-resinifying urea and a straight-chain polyamine the preferred proportions are about 20 mol per cent polyamine and 80 mol per cent urea, but the proportions may be varied from about 5 mol per cent to 30 mol per cent polyamine. The proportion of formaldehyde used will vary according to the specific amines chosen. The limits of the formaldehyde-amine ratio may be roughly taken to be between the minimum which will render the resulting resin insoluble and a maximum of two molecules of formaldehyde per amino group.

An especially active resin is obtained if one co-resinifies melamine and an aliphatic straight-chain polyamine. Such a resin has a high anion-exchange capacity and yet is insoluble in most liquids and will not discolor liquids coming in contact therewith.

It is desirable to carry out the resin-forming reaction under such conditions that a gel is formed before the water present (e. g. that carried into the reaction mixture with the aqueous formaldehyde commonly used) is removed. When such a gel is later dried, it is converted to a hard, horny, but microscopically porous structure which will not again swell appreciably when placed in water, but which will be active as an anion-exchange substance. Methods of resinifying amino compounds with formaldehyde are varied and well known. A preferred method is given here and is illustrated by the examples, but the reaction can be carried out in other ways which will occur to one familiar with the resin art.

In order that a resin possessing the desired gel structure be obtained, the amine or mixture of amines with or without added urea is first condensed with formaldehyde under the influence of a strong basic catalyst such as sodium hydroxide, potassium hydroxide, trimethylbenzyl ammonium hydroxide, or the like. Such a reaction is ordinarily exothermic. The condensation is allowed to proceed until incipient precipitation occurs. This point may be determined by carrying out a test reaction, noting the temperature variation with time and also noting the time at which a precipitate first appears. It is impossible to state a definite time period in advance because of the many possible variables such as reactants, external temperature, dilution, size of batch, etc. However, under ordinary conditions, incipient precipitation should be obtained within a period varying from about 5 minutes to about 1 hour.

In certain cases, especially if the primary amine content is high, actual precipitation may not occur within a reasonable time. In such a case, an increase in viscosity of the solution is usually noted, and this condition may be taken to indicate that the alkali-catalyzed condensation has proceeded to a sufficient extent. In most cases, it is usually advisable to allow the exothermic reaction to proceed until a maximum temperature has been reached and the temperature has started to drop. If the reaction stage is carried slightly beyond incipient precipitation and a small quantity of precipitate is allowed to form, no great harm is done.

When the alkaline condensation product is obtained, it is immediately acidified with a strong mineral acid such as hydrochloric acid. The amount of acid should be sufficient to neutralize the basic catalyst used and also any unreacted amino groups and in addition provide a definite excess so that the reaction mixture is strongly acid. The acid catalyst should be added quickly with rapid agitation because the acid-catalyzed condensation sometimes occurs with great rapidity. On the other hand, if the proportion of aliphatic polyamine is high, the time required for gelation may be prolonged to hours or even days. After the acid is added, the reaction mixture is allowed to stand until a firm gel is obtained. The gel is then broken up by a convenient mechanical means and dried at a temperature not much above room temperature, say 45° C. or below. If desired, the gel particles may be washed in water or an alkaline solution before drying. The use of a vacuum drier facilitates the removal of water at a low temperature. The gel dries down to hard, dense particles which may be further ground, screened, and washed, when it is in condition for use.

A suitable method of using the resins of the invention for effecting anion-exchange is to form a filter bed of screened granules, and regenerate them with a basic substance such as sodium hydroxide, ammonium hydroxide, sodium carbonate or sodium bicarbonate, depending on the anions to be exchanged. After washing out the excess regenerant, the filter bed is ready for use. In use, the liquid which contains anions to be exchanged for those mobile anions present in the resin, is trickled downwardly through the filter bed; the effluent then having its anion content substantially different from the affluent liquid. An alternative method is to suspend finely divided particles of regenerated resin in a volume of liquid for a short time, say 30 minutes, whereafter the resin may be filtered out of the liquid. Similar procedures may be adopted from those known to the water-softening art.

The invention is illustrated by the following examples which should not be construed as to limit the invention as to scope or proportions. Parts are by weight.

*Example 1.*—Twenty parts of urea (approximately 0.333 molecular proportion), 11.4 parts diethylenetriamine (approximately 0.111 molecular proportion), 72 parts 37.5% formalin (approximately 0.900 molecular proportion) and 1.5 parts 50% solution of sodium hydroxide were mixed together to form a clear solution. The temperature spontaneously rose to 70° C. After 15 minutes the viscosity had increased considerably, showing that a condensation had occurred. Sixty parts of 18% hydrochloric acid were mixed in, and after several days the mass had become completely gelled. The product was dried at room temperature, ground to pass through a 20-mesh screen and washed. The anion-exchange capacity was 1.16 milliequivalents per cubic centimeter of 20/40-mesh resin when regenerated with sodium hydroxide.

*Example 2.*—Twenty parts urea (approximately 0.333 molecular proportion), 8.6 parts diethylene triamine (approximately 0.084 molecular proportion), 51 parts 37.5% formalin (approximately 0.638 molecular proportion) and 1.5 parts 50% sodium hydroxide solution were mixed together to form a clear solution which spontaneously heated to 62° C. After 15 minutes, 50 parts of 18% hydrochloric acid were added. The resin gelled in 30 minutes. The gel was broken up and dried at room temperature until a hard, horny mass was obtained. This was granulated, washed, and tested for anion-exchange capacity, which proved to be 1.38 milliequivalents per cc. when regenerated with sodium hydroxide.

*Example 3.*—Twenty parts urea (approximately 0.333 molecular proportion), 12.3 parts propylene diamine (approximately 0.166 molecular proportion), 61 parts 37.5% formalin (approximately 0.763 molecular proportion) and 1.5 parts 50% sodium hydroxide solution were mixed together. The temperature rose to 70° C. after standing 13 minutes. After 15 minutes more the solution was still clear but had become very viscous, so 75 parts of 10% hydrochloric acid were added. On standing overnight a soft gel formed which exhibited pronounced syneresis. This was broken up, dried, granulated and washed. The anion-exchange capacity was 0.5 milliequavalent per cc. when regenerated with sodium hydroxide.

*Example 4.*—Twenty parts urea (approximately 0.333 molecular proportion), 8.6 parts hydroxyethyl ethylene diamine (approximately 0.083 molecular proportion), 51 parts 37.5% formalin (approximately 0.638 molecular proportion) and 1.5 parts 50% sodium hydroxide solution were mixed together. After 25 minutes 50 parts of 18% hydrochloric acid were added. The gel formed was dried, granulated and washed. The anion-exchange capacity was 0.94 milliequivalent per cc. when regenerated with sodium hydroxide.

*Example 5.*—Twenty parts urea (approximately 0.333 molecular proportion), 16.1 parts tetraethylene pentamine (approximately 0.085 molecular proportion), 51 parts 37.5% formalin (approximately 0.638 molecular proportion) and 1.5 parts 50% sodium hydroxide solution were mixed together. As soon as all of the urea had dissolved, a viscous light yellow solution had formed, so 100 parts of 18% hydrochloric acid were immediately added. The mixture set to a soft white gel in 6 minutes.

Example 6.—Twenty-one parts melamine (approximately 0.167 molecular proportion), 81 parts 37.5% formalin (approximately 1.013 molecular proportions) and 1.5 parts 50% sodium hydroxide solution were mixed together. The melamine dissolved slowly and the temperature rose to 45° C. After 1 hour, the mixture had become pasty, and at this point 50 parts water and 50 parts 18% hydrochloric acid were added. On standing overnight a stiff white gel was formed. This was broken up, dried at room temperature, granulated and washed. The anion-exchange capacity was 1.22 milliequivalents per cc. when regenerated with sodium hydroxide.

Example 7.—Twenty-one parts melamine (approximately 0.167 molecular proportion), 8.6 parts diethylene triamine (approximately 0.084 molecular proportion), 94 parts 37.5% formalin (approximately 1.175 molecular proportions) and 1.5 parts sodium hydroxide solution were mixed together. An exothermic reaction carried the temperature quickly to 61° C. In 5 minutes the mass had started to become pasty, so 50 parts 18% hydrochloric acid were added. A clear solution was obtained, which set to a hard friable gel after standing for 3 days. This was crumbled and dried at room temperature. The anion-exchange capacity was 3.04 milliequivalents per cc. when regenerated with sodium hydroxide.

Methods of preparing amino resins have been given. Such resins are adapted to utilize the anion-exchange reaction for purifying water, as for instance in removing chlorides or sulfates and replacing them with hydroxyl ions or nitrates; for removing acids from many liquids, aqueous and non-aqueous, by replacing the acid anion by hydroxyl ions thus forming water; or for neutralizing the effluent from an acid-regenerated base-exchange material.

Having thus described our invention, what we claim as new and desire to secure by Letters Patent is:

1. A process of exchanging anions in fluid media, which comprises contacting the anion-containing fluid medium with a substantially water-insoluble resinous reaction product of formaldehyde, melamine and diethylene triamine in the proportions of approximately 1.175 molecular proportions of formaldehyde, 0.167 molecular proportion of melamine and 0.084 molecular proportion of diethylene triamine that has been initially reacted in the presence of an aqueous solution of a strong basic catalyst and subsequently gelled and set to a hard friable gel with a strong acid.

2. A process of exchanging anions in fluid media, which comprises contacting the anion-containing fluid medium with a substantially water-insoluble reaction product of approximately 21 parts by weight of melamine, approximately 8.6 parts by weight of diethylene triamine, approximately 94 parts by weight of 37.5% formaldehyde solution and approximately 1.5 parts by weight of sodium hydroxide, that has been gelled after the initial reaction of these substances and set to a hard friable gel with a strong acid.

3. A resinous material that is active for anion-exchange in fluid media, which comprises a substantially water-insoluble resinous reaction product of formaldehyde, melamine and diethylene triamine in the proportions of approximately 1.175 molecular proportions of formaldehyde, 0.167 molecular proportion of melamine and 0.084 molecular proportion of diethylene triamine that has been initially reacted in the presence of an aqueous solution of a strong basic catalyst and subsequently gelled and set to a hard friable gel with a strong acid.

4. A resinous material that is active for anion-exchange in fluid media, which comprises a substantially water-insoluble resinous reaction product of approximately 21 parts by weight of melamine, approximately 8.6 parts by weight of diethylene triamine, approximately 94 parts by weight of 37.5% formaldehyde solution and approximately 1.5 parts by weight of sodium hydroxide, that has been gelled after the initial reaction of these substances and set to a hard friable gel with a strong acid.

5. A process for the preparation of a resinous material that is active for anion-exchange in fluid media, which comprises initially reacting together approximately 1.175 molecular proportions of formaldehyde, approximately 0.167 molecular proportion of melamine and approximately 0.084 molecular proportion of diethylene triamine in the presence of an aqueous solution of a strong basic catalyst until a viscous mass is produced and subsequently gelling the reaction mixture with a strong acid and allowing the mass to set to a hard friable gel.

6. A process for the preparation of a resinous material that is active for anion-exchange in fluid media, which comprises mixing together approximately 21 parts by weight of melamine, approximately 8.6 parts by weight of diethylene triamine, approximately 94 parts by weight of 37.5% formaldehyde solution and approximately 1.5 parts by weight of sodium hydroxide, and, after the mass has started to become pasty, adding approximately 50 parts by weight of 18% hydrochloric acid and allowing the mass to set to a hard friable gel.

PHILIP I. BOWMAN.
HARRY BURRELL.